United States Patent
Park et al.

(10) Patent No.: US 9,983,557 B2
(45) Date of Patent: May 29, 2018

(54) ADAPTIVE THERMAL CONTROL AND POWER BUDGET

(71) Applicant: QUALCOMM Incorporated, San Diego, CA (US)

(72) Inventors: Hee Jun Park, San Diego, CA (US); Rajat Mittal, San Diego, CA (US); Mehdi Saeidi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 317 days.

(21) Appl. No.: 14/882,158

(22) Filed: Oct. 13, 2015

(65) Prior Publication Data

US 2017/0102676 A1    Apr. 13, 2017

(51) Int. Cl.
*G05D 23/00* (2006.01)
*G05B 15/02* (2006.01)
*G06F 1/20* (2006.01)

(52) U.S. Cl.
CPC ............. *G05B 15/02* (2013.01); *G06F 1/206* (2013.01)

(58) Field of Classification Search
None
See application file for complete search history.

(56) References Cited

U.S. PATENT DOCUMENTS

| | | | |
|---|---|---|---|
| 6,366,486 B1 * | 4/2002 | Chen ....................... | H02M 3/00 361/707 |
| 6,453,378 B1 | 9/2002 | Olson et al. | |
| 8,306,772 B2 | 11/2012 | Cox et al. | |
| 8,452,463 B2 | 5/2013 | Cox et al. | |
| 8,762,097 B2 * | 6/2014 | Millet ..................... | G06F 1/206 374/100 |
| 2011/0301777 A1 * | 12/2011 | Cox ........................ | G06F 1/206 700/299 |
| 2014/0074312 A1 * | 3/2014 | Bates ................. | G05D 23/1927 700/299 |
| 2014/0108832 A1 * | 4/2014 | Yamaguchi ............. | G06F 1/203 713/320 |
| 2015/0000889 A1 | 1/2015 | Bellamkonda et al. | |
| 2015/0103187 A1 | 4/2015 | Schieltz et al. | |

OTHER PUBLICATIONS

International Search Report and Written Opinion—PCT/US2016/051891—ISA/EPO—dated Dec. 8, 2016.

* cited by examiner

*Primary Examiner* — Philip Wang
(74) *Attorney, Agent, or Firm* — Arent Fox LLP

(57) ABSTRACT

A method, an apparatus, and a computer program product for performance management are provided. The apparatus may be an electronic device. The electronic device detects a change of form factor mode or ambient wind using a detection circuit or at least one sensor. The change of form factor mode may include at least one of folding the electronic device, unfolding the electronic device, rolling the electronic device, changing a flexible shape of the electronic device, or equipping a cover on the electronic device. A set of thermal control parameters may be determined based on the detected change. The set of thermal control parameters may be retrieved from a lookup table or calculated using a mathematical model. The electronic device adjusts the performance based on the set of thermal control parameters.

30 Claims, 11 Drawing Sheets

|   | Si Temperature | Ambient Wind | Form Factor Mode | | Skin Temperature |
|---|---|---|---|---|---|
| A | 80 °C | No | Folded | ↑ | 39 °C |
| B | 80 °C | No | Unfolded (Spread) | ↑ | 33 °C |
| C | 80 °C | Yes | Folded | ↑ | 36 °C |
| D | 80 °C | Yes | Unfolded (Spread) | ↑ | 30 °C |

FIG. 6

ADAPTIVE THERMAL CONTROL AND POWER BUDGET

BACKGROUND

Field

The present disclosure relates generally to performance management of electronic devices and systems, and more particularly, to adaptive thermal control and power budget of an electronic device based on ambient air flow condition and/or form factor mode of the electronic device.

Background

As electronic devices, especially mobile computing devices, become more integrated and include more computing power, they may generate more heat. For example, a modern smart phone may include one or more highly integrated components known as a system on a chip ("SoC") or a system in package ("SiP"). Each SoC or SiP may have one or more integrated circuits ("ICs") with one or more processor cores, memory circuits, graphics processing circuits, radio frequency communication circuits, and other digital and analog circuits. Further, multiple SoCs or SiPs may be stacked in a package on package ("PoP") configuration. A common PoP configuration includes one SoC or SiP package that has processing and other circuits, with a second stacked package that includes volatile and/or non-volatile memory components.

These highly integrated processing components may generate a large amount of heat within a tightly integrated packaging structure. Additionally, many manufacturers desire to increase the number of processing cores and processor clock speeds, further increasing the amount of heat generated in the package. For mobile computing device processors especially, heat may become a limiting factor to computing performance.

SUMMARY

In an aspect of the disclosure, a method, a computer program product, and an apparatus for performance management are provided. The apparatus may be an electronic device. The electronic device detects a change of form factor mode or ambient wind using a detection circuit or at least one sensor. A set of thermal control parameters is determined based on the detected change. The set of thermal control parameters may be retrieved from a lookup table or calculated using a mathematical model. The electronic device adjusts performance based on the set of thermal control parameters.

In one configuration, the electronic device may monitor the performance and the level of thermal throttling. In response to low performance or the level of thermal throttling exceeding a threshold level, the electronic device displays a message to recommend form factor mode change for more performance.

BRIEF DESCRIPTION OF THE DRAWINGS

FIG. 6 is a table illustrating an example of the relationship between Si temperature and skin temperature of a mobile device.

DETAILED DESCRIPTION

Figure 1:
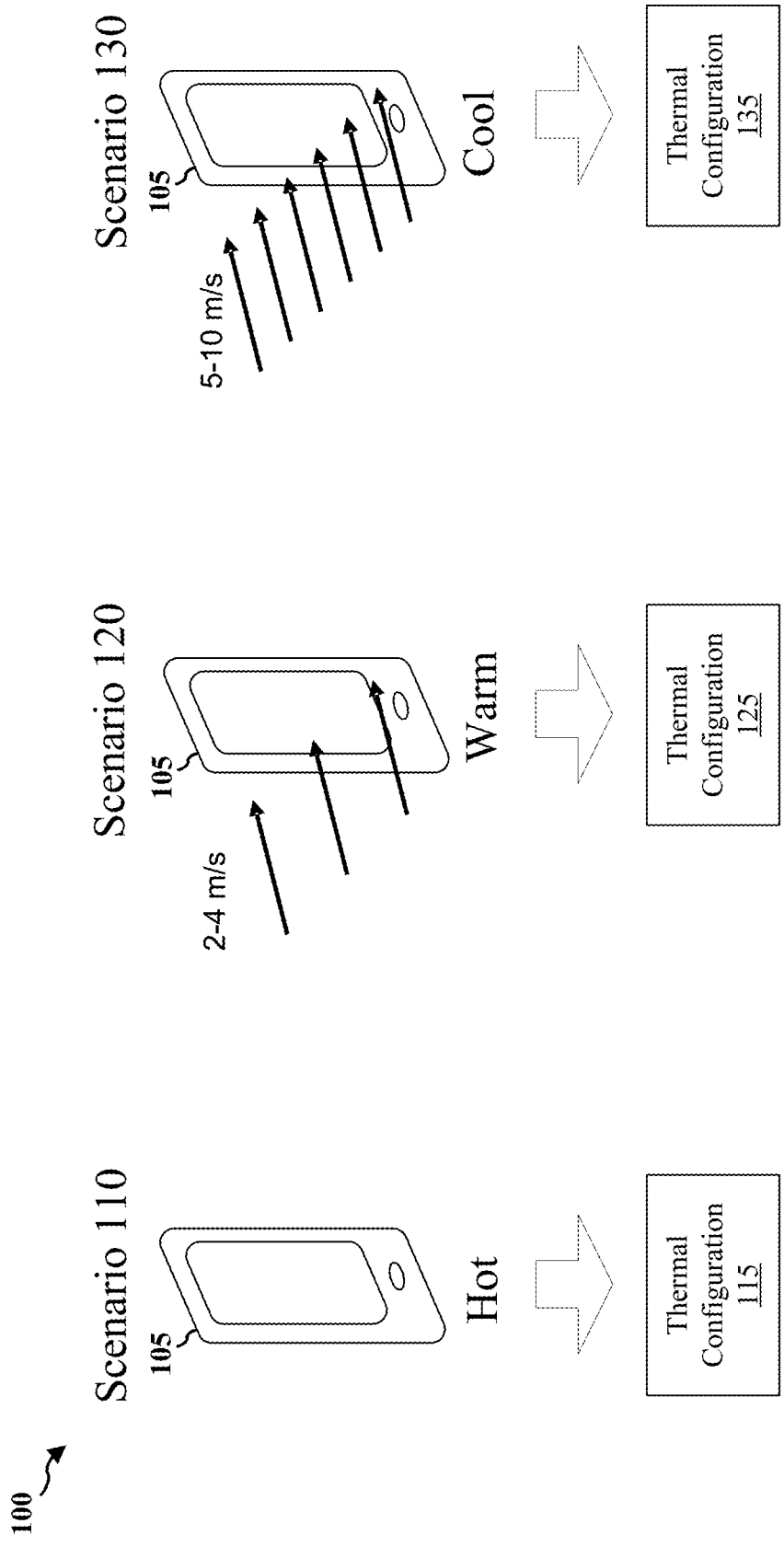
FIG. 1 is a diagram illustrating determining different thermal configurations based on different ambient wind conditions in relation to an electronic device.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of a performance management mechanism for electronic devices will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, combinations of the aforementioned types of computer-readable media, or any other medium that can be used to store computer executable code in the form of instructions or data structures that can be accessed by a computer.

The cooling capability of an electronic device changes if the speed of the ambient air flow (wind) to which the electronic device is exposed changes. The ambient air flow is the air flow in the environment surrounding the electronic device. The higher the wind speed, the easier the transfer of heat from the electronic device to ambient air. Typically, the thermal control of an electronic device does not adjust thermal control parameters based on ambient wind condition of the electronic device. Instead, typically thermal control of an electronic device is designed to address the worst case condition in which no air flow movement is present in the ambient air of the electronic device, thus leaving some performance on the table.

FIG. 1 is a diagram 100 illustrating determining different thermal configurations based on different ambient wind conditions in relation to an electronic device. As illustrated in diagram 100, an electronic device 105 may run a heavy workload while exposing to ambient air flow. The electronic device 105 may be a mobile computing device, which may be a smart phone, a tablet computer, a smart watch, a head-mounted display, a portable media player, a personal navigation device, a wearable device, a digital camera/camcorder, etc. The electronic device 105 may also be referred to as a mobile device, a mobile station, a user equipment (UE), a subscriber station, a mobile unit, a subscriber unit, a wireless unit, a remote unit, a wireless device, a wireless communications device, a remote device, a mobile subscriber station, an access terminal, a mobile terminal, a wireless terminal, a remote terminal, a handset, a user agent, a mobile client, a client, or some other suitable terminology.

In scenario 110, there is no ambient air flow surrounding the electronic device 105. This may be an in-door environment in which there is no wind and the electronic device 105 remains motionless. There is minimal natural heat dissipation (e.g., convection) for the electronic device 105 in scenario 110. Convection is the transfer of heat from one place to another by the movement of fluids (e.g., air). In one configuration, the electronic device 105 dissipates heat by convective heat transfer between the electronic device 105 and the ambient air (i.e., heat transfer by the movement of ambient air). When the electronic device 105 runs a heavy workload in scenario 110, the electronic device 105 becomes hot (i.e., having a high temperature) quickly.

In scenario 120, there is light ambient air flow (e.g., 2-4 m/s) surrounding the electronic device 105. This may be a user walking with the electronic device 105 held in his/her hand. There is more heat dissipation for the electronic device 105 in scenario 120 than in scenario 110 due to forced heat dissipation caused by the light ambient air flow. When the electronic device 105 runs the same heavy workload in scenario 120, the electronic device 105 becomes warm (i.e., having a moderate temperature that is lower than the temperature in scenario 110).

In scenario 130, there is strong ambient air flow (e.g., 5-10 m/s) surrounding the electronic device 105. This may be an out-door environment in which there is strong wind. High heat dissipation for the electronic device 105 is possible in scenario 130 due to high forced heat dissipation caused by the strong ambient air flow. When the electronic device 105 runs the same heavy workload in scenario 130, the electronic device 105 may be able to remain cool (i.e., having a temperature that is lower than the temperatures in scenarios 110 and 120). Because the temperatures of the electronic device 105 in scenarios 120 and 130 are lower than the temperature in scenario 110, there is additional room in boosting performance of the electronic device 105 in scenarios 120 and 130.

Traditional thermal control is designed for the worst case scenario of scenario 110. Ambient air flow speed is not taken into consideration when the thermal configuration of the electronic device 105 is determined. Thus, traditional thermal control does not utilize additional performance enhancement opportunities presented in scenarios 120 and 130.

In one aspect, the electronic device 105 may manipulate the system power budget via actively detecting the ambient wind speed and adjusting the power budget of the electronic device 105 accordingly. For example, the electronic device 105 may determine a thermal configuration 115 based on the ambient wind condition of scenario 110, a thermal configuration 125 based on the ambient wind condition of scenario 120, and a thermal configuration 135 based on the ambient wind condition of scenario 130. The power budget for thermal configuration 135 may be higher than the power budget for thermal configuration 125, which may be higher than the power budget for thermal configuration 115. Higher power budget may imply higher performance for the electronic device 105. Each of the thermal configurations 115, 125, and 135 may include a set of thermal control parameters/policies. Two different thermal configurations may have different values with regard to one or more thermal control parameters. In one aspect, the thermal configuration for each scenario may be calculated using a mathematical model. In another aspect, the thermal configuration for each scenario may be determined by looking up a lookup table.

In one aspect, the set of thermal control parameters may include a moving average power consumption limit, which limits the power consumption of the electronic device 105. The higher the power budget, the higher the moving average power consumption limit may be set. For example, the thermal configuration 135 may set a higher moving average power consumption limit on the electronic device 105 than the thermal configuration 115 would.

In one aspect, the set of thermal control parameters may include a maximum operating frequency limit, which limits the operating frequency of the electronic device 105. The higher the power budget, the higher the maximum operating frequency limit may be set. For example, the thermal configuration 135 may set a higher maximum operating frequency limit on the electronic device 105 than the thermal configuration 115 would.

In one aspect, the set of thermal control parameters may include enabling/disabling a set of power features of the electronic device 105. The higher the power budget, the more power features of the electronic device 105 may be enabled. The lower the power budget, the more power features of the electronic device 105 may be disabled. For example, the thermal configuration 135 may enable more power features of the electronic device 105 than the thermal configuration 115 would.

In one aspect, the set of thermal control parameters may include the CPU scheduler policy (big.LITTLE CPU affinity) of the electronic device 105. Big.LITTLE is a heterogeneous computing architecture that couples relatively slower, low-power processor cores (LITTLE) with relatively more powerful and power-hungry ones (big). When the power budget is high, the scheduler of the electronic device 105 may decide to put more jobs on the "big" cores. When the power budget is low, the scheduler of the electronic device 105 may decide to put more jobs on the "LITTLE" cores. For example, the thermal configuration 135 may cause the scheduler of the electronic device 105 to put more jobs on the "big" cores, and the thermal configuration 115 may cause the scheduler of the electronic device 105 to put more jobs on the "LITTLE" cores.

In one aspect, the set of thermal control parameters may include a mode of active cooling for the electronic device 105. The mode of active cooling may be fan speed, thermoelectric cooling (TEC) current, etc. Active cooling usually consumes more power, thus may be enabled when the power budget is high and disabled when the power budget is low. For example, the thermal configuration 135 may enable the mode of active cooling for the electronic device 105, while the thermal configuration 115 may disable the mode of active cooling.

In one aspect, the set of thermal control parameters may include a limit for on-die silicon (Si) temperature sensor measurement of the electronic device 105, or an offset between the skin temperature and the on-die Si temperature sensor measurement. The Si temperature of the electronic device 105 is generally tracked through a sensor on the chip (e.g., on-die Si temperature sensor). The offset between the skin temperature and the on-die sensor measurement is calibrated a priori. In different thermal configurations, the offset between the skin temperature and the on-die sensor measurement would differ. For example, the offset between the skin temperature and the on-die sensor measurement may be larger for thermal configuration 135 than for thermal configuration 115 or 125. The different offsets between the skin temperature and the on-die sensor measurement for different thermal configurations could be fed to the hardware/software in the form of a lookup table.

The ambient air flow condition of the electronic device 105 may be detected through one or more sensors of the electronic device 105. In one aspect, the one or more sensors may be one or more microphones of the electronic device 105 and the wind speed may be estimated based on wind noise from the microphones. In one aspect, the one or more sensors may use a piezoelectric beam (e.g., stripe or hair shaped) to determine ambient wind speed. In one aspect, the one or more sensors may detect heat spread direction in order to determine ambient wind speed.

The amount of power that can be dissipated by an electronic device (e.g., 105) may be determined by $$Q = Q_{forced} + Q_{natural} + Q_{radi} \tag{1}$$

where

Q is the amount of power that can be dissipated by the electronic device, $Q_{forced}$ is the amount of power that can be dissipated through convection with ambient wind, $Q_{natural}$ is the amount of power that can be dissipated through convection without ambient wind, and $Q_{radi}$ is the amount of power that can be dissipated through radiation.

Therefore, the amount of power that can be dissipated by an electronic device may be the sum of $Q_{forced}$, $Q_{natural}$, and $Q_{radi}$. In absence of ambient air flow (i.e., no ambient wind), $Q_{forced}$ is equal to zero. However, with ambient air flow, $Q_{forced}$ is much greater than $Q_{natural}$.

For an electronic device, the amount of power than can be dissipated through convection with ambient wind (i.e., $Q_{forced}$) may be determined by $$Q_{forced} = h \times A \times (T_{skin} - T_{amb}) \tag{2}$$

where h is heat transfer coefficient (dictated by the ambient air flow the electronic device is subjected to), $T_{skin}$ is skin temperature limit (determined by ergonomic), $T_{amb}$ is temperature of the environment surrounding the electronic device, and A is the exposed surface area of the electronic device.

Therefore, $Q_{forced}$ may be linearly related to heat transfer coefficient (h). The larger the heat transfer coefficient, the larger amount of power can be dissipated through convection with ambient wind.

Figure 2:
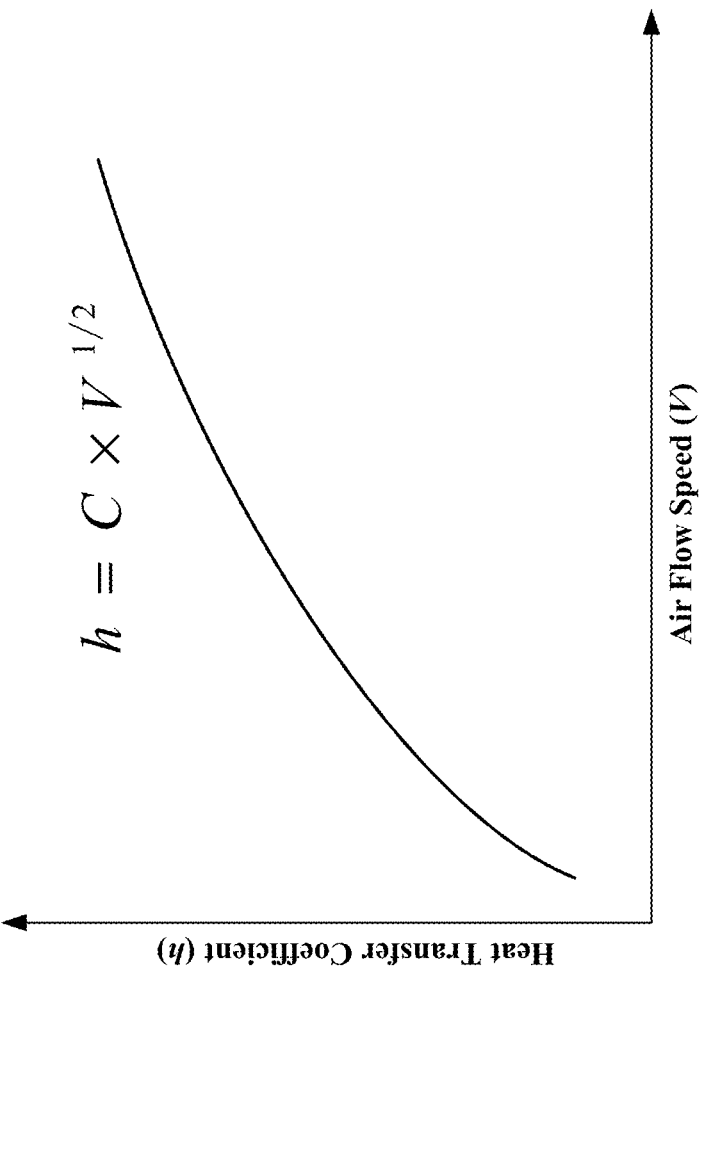
FIG. 2 is a diagram illustrating the relationship between heat transfer coefficient and wind speed.

FIG. 2 is a diagram 200 illustrating the relationship between heat transfer coefficient and wind speed. For an electronic device (e.g., 105), heat transfer coefficient (h) may be determined by $$h = C \times V^{1/2} \tag{3}$$

where

C is a constant, and

V is ambient air flow (wind) speed.

As shown in diagram 200, the heat transfer coefficient (h) is strongly dependent on the speed of ambient air flow (V). For example, doubling the ambient wind speed can increase the heat transfer coefficient by 40%.

Flexible/configurable electronic devices are electronic devices whose form factor mode (e.g., shape, size, and/or exposed surface area) can be changed. The form factor mode of the electronic device may dictate how effectively the electronic device dissipates heat to the ambient air. The cooling capability of an electronic device changes if the form factor mode of the electronic device changes. Typically, the thermal control of an electronic device does not adjust thermal control parameters based on form factor mode of the electronic device, thus leaving some performance on the table.

Figure 3:
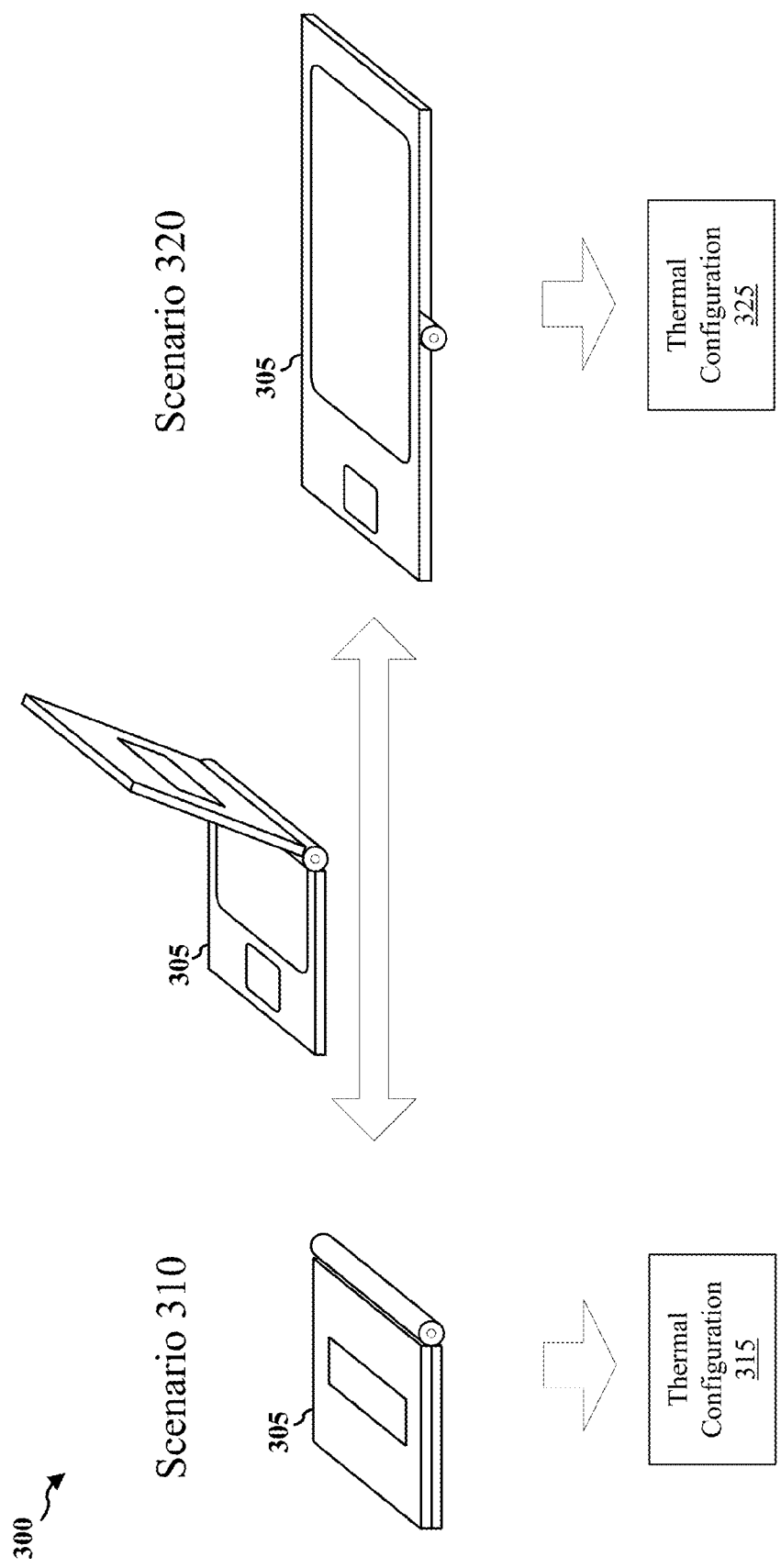
FIG. 3 is a diagram illustrating determining different thermal configurations based on different form factor modes of an electronic device.

FIG. 3 is a diagram 300 illustrating determining different thermal configurations based on different form factor modes of an electronic device. As illustrated in diagram 300, an electronic device 305 may run a workload while changing its form factor mode. The electronic device 305 may be a mobile computing device, which may be a smart phone, a tablet computer, a smart watch, a head-mounted display, a portable media player, a personal navigation device, a wearable device, a digital camera/camcorder, etc. The electronic device 305 may also be referred to as a mobile device, a mobile station, a user equipment (UE), a subscriber station, a mobile unit, a subscriber unit, a wireless unit, a remote unit, a wireless device, a wireless communications device, a remote device, a mobile subscriber station, an access terminal, a mobile terminal, a wireless terminal, a remote terminal, a handset, a user agent, a mobile client, a client, or some other suitable terminology.

In scenario 310, the electronic device 305 is folded. In scenario 320, the electronic device 305 is unfolded. The exposed surface area of the electronic device 305 is twice as large in scenario 320 as it is in scenario 310. There is more heat dissipation (e.g., double in amount) for the electronic device 305 in scenario 320 than in scenario 310 due to heat dissipation caused by the enlarged exposed surface area. When the electronic device 305 maintains the same skin temperature limit, in scenario 320, the electronic device 305 may be able to dissipate twice the amount of heat as in scenario 310. Therefore, there is additional room in boosting performance of the electronic device 305 in scenario 320.

In traditional thermal control, form factor mode is not taken into consideration when the thermal configuration of the electronic device 305 is determined. Thus, traditional thermal control does not utilize additional performance enhancement opportunities presented in scenario 320.

In one aspect, the electronic device 305 may manipulate the system power budget via harnessing the current mechanical/physical configuration (e.g., form factor mode) of the electronic device 305 and adjusting the power budget of the electronic device 305 accordingly. For example, the electronic device 305 may determine a thermal configuration 315 in scenario 310 and a thermal configuration 325 in scenario 320. The power budget for the thermal configuration 325 may be higher than the power budget for the thermal configuration 315. Higher power budget may imply higher performance for the electronic device 305. Each of the thermal configurations 315 and 325 may include a set of thermal control parameters/policies. Two different thermal configurations may have different values with regard to one or more thermal control parameters. In one aspect, the thermal configuration for each scenario may be calculated using a mathematical model. In another aspect, the thermal configuration for each scenario may be determined by looking up a lookup table.

In one aspect, the set of thermal control parameters may include a moving average power consumption limit, which limits the power consumption of the electronic device 305. The higher the power budget, the higher the moving average power consumption limit may be set. For example, the thermal configuration 325 may set a higher moving average power consumption limit on the electronic device 305 than the thermal configuration 315 would.

In one aspect, the set of thermal control parameters may include a maximum operating frequency limit, which limits the operating frequency of the electronic device 305. The higher the power budget, the higher the maximum operating frequency limit may be set. For example, the thermal configuration 325 may set a higher maximum operating frequency limit on the electronic device 305 than the thermal configuration 315 would.

In one aspect, the set of thermal control parameters may include enabling/disabling a set of power features of the electronic device 305. The higher the power budget, the more power features of the electronic device 305 may be enabled. The lower the power budget, the more power features of the electronic device 105 may be disabled. For example, the thermal configuration 325 may enable more power features of the electronic device 305 than the thermal configuration 315 would.

In one aspect, the set of thermal control parameters may include the CPU scheduler policy (big.LITTLE CPU affinity) of the electronic device 305. Big.LITTLE is a heterogeneous computing architecture that couples relatively slower, low-power processor cores (LITTLE) with relatively more powerful and power-hungry ones (big). When the power budget is high, the scheduler of the electronic device 305 may decide to put more jobs on the "big" cores. When the power budget is low, the scheduler of the electronic device 305 may decide to put more jobs on the "LITTLE" cores. For example, the thermal configuration 325 may cause the scheduler of the electronic device 305 to put more jobs on the "big" cores, and the thermal configuration 315 may cause the scheduler of the electronic device 305 to put more jobs on the "LITTLE" cores.

In one aspect, the set of thermal control parameters may include a mode of active cooling for the electronic device 305. The mode of active cooling may be fan speed, TEC current, etc. Active cooling usually consumes more power, thus may be enabled when the power budget is high and disabled when the power budget is low. For example, the thermal configuration 325 may enable the mode of active cooling for the electronic device 305, while the thermal configuration 315 may disable the mode of active cooling.

In one aspect, the set of thermal control parameters may include a limit for on-die Si temperature sensor measurement of the electronic device 305, or an offset between the skin temperature and the on-die Si temperature sensor measurement. The Si temperature of the electronic device 305 is generally tracked through a sensor on the chip (e.g., on-die Si temperature sensor). The offset between the skin temperature and the on-die sensor measurement is calibrated a priori. In different thermal configurations, the offset between the skin temperature and the on-die sensor measurement would differ. For example, the offset between the skin temperature and the on-die sensor measurement may be larger for thermal configuration 325 than for thermal configuration 315. The different offsets between the skin temperature and the on-die sensor measurement for different thermal configurations could be fed to the hardware/software in the form of a lookup table.

The current form factor mode of the electronic device 305 may be detected through a piezoelectric bending sensor, physical switches, and/or magnet or Hall effect sensors of the electronic device 305. The change of form factor mode for the electronic device 305 may include folding, unfolding, rolling, or opening the electronic device 305. If the electronic device 305 is a flexible device, the change of form factor mode may include changing the shape of the flexible electronic device 305.

In one aspect, the change of form factor mode may not be limited to the electronic device 305. For example, slapping a cover on for protection could also be considered a shape change for the electronic device 305. A cover may be detected by a magnet or Hall effect sensor. Having a cover on would enable the Si temperature limit to be increased, thus allowing for higher power budget and more performance.

The amount of power that can be dissipated by an electronic device (e.g., 305) may be determined by $$Q = h \times A \times (T_{skin} - T_{amb}) \quad (4)$$

where
Q is the amount of power that can be dissipated by the electronic device,
h is heat transfer coefficient (dictated by the ambient air flow the electronic device is subjected to),
$T_{skin}$ is skin temperature limit (determined by ergonomic),
$T_{amb}$ is temperature of the environment surrounding the electronic device, and
A is the exposed surface area of the electronic device.

Therefore, the amount of power than can be dissipated by the electronic device (Q) may be linearly related to the exposed surface area of the electronic device (A). The larger the exposed surface area of the electronic device, the larger amount of power can be dissipated by the electronic device.

Figure 4:
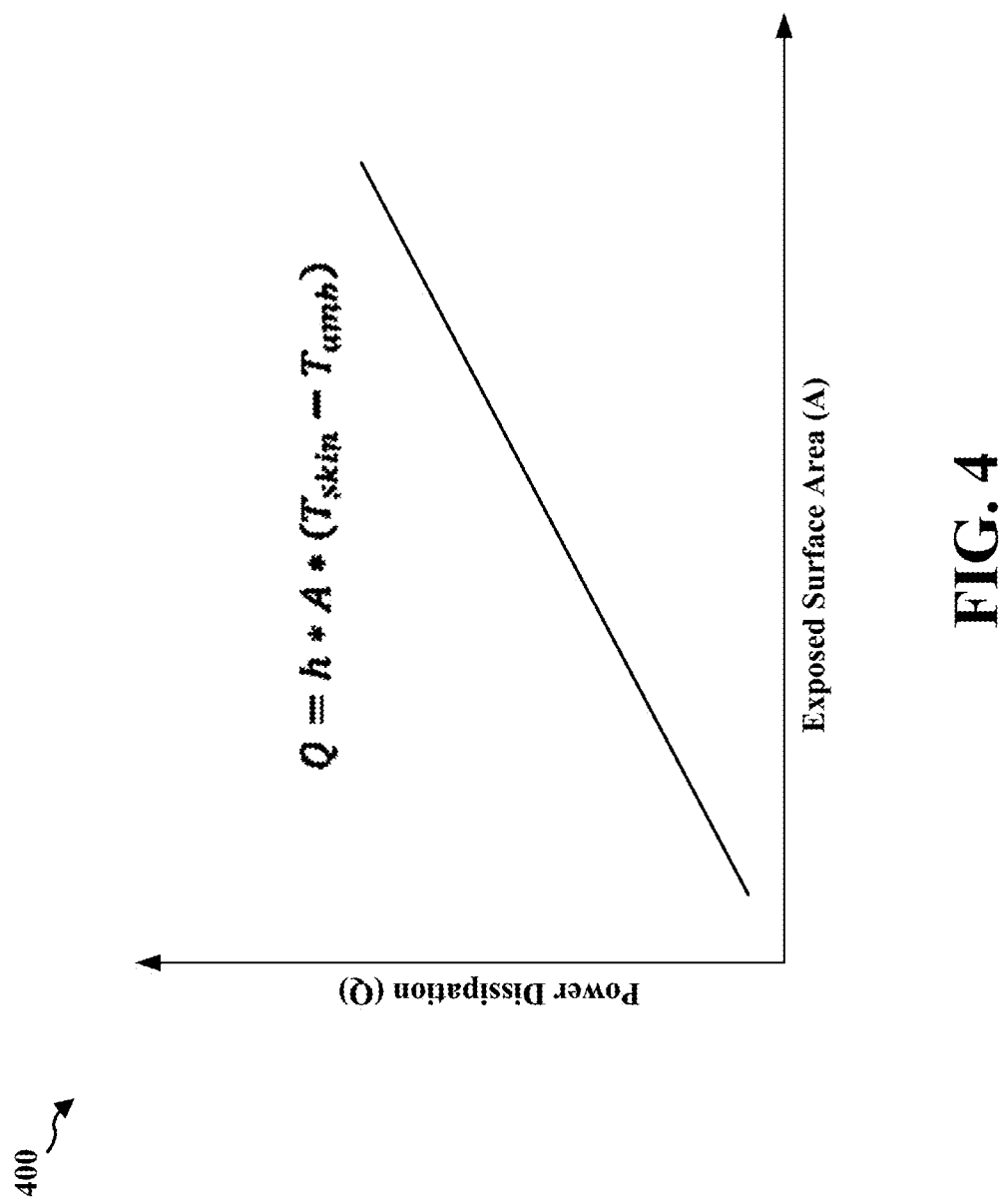
FIG. 4 is a diagram illustrating the relationship between power dissipation and the exposed surface area of an electronic device.

FIG. 4 is a diagram 400 illustrating the relationship between power dissipation and the exposed surface area of an electronic device (e.g., 305). As shown in diagram 400, the power dissipation (Q) is strongly dependent on the exposed surface area (A). For example, doubling the exposed surface area (e.g., by unfolding the electronic device) can double the power dissipation of the electronic device.

Figure 5:
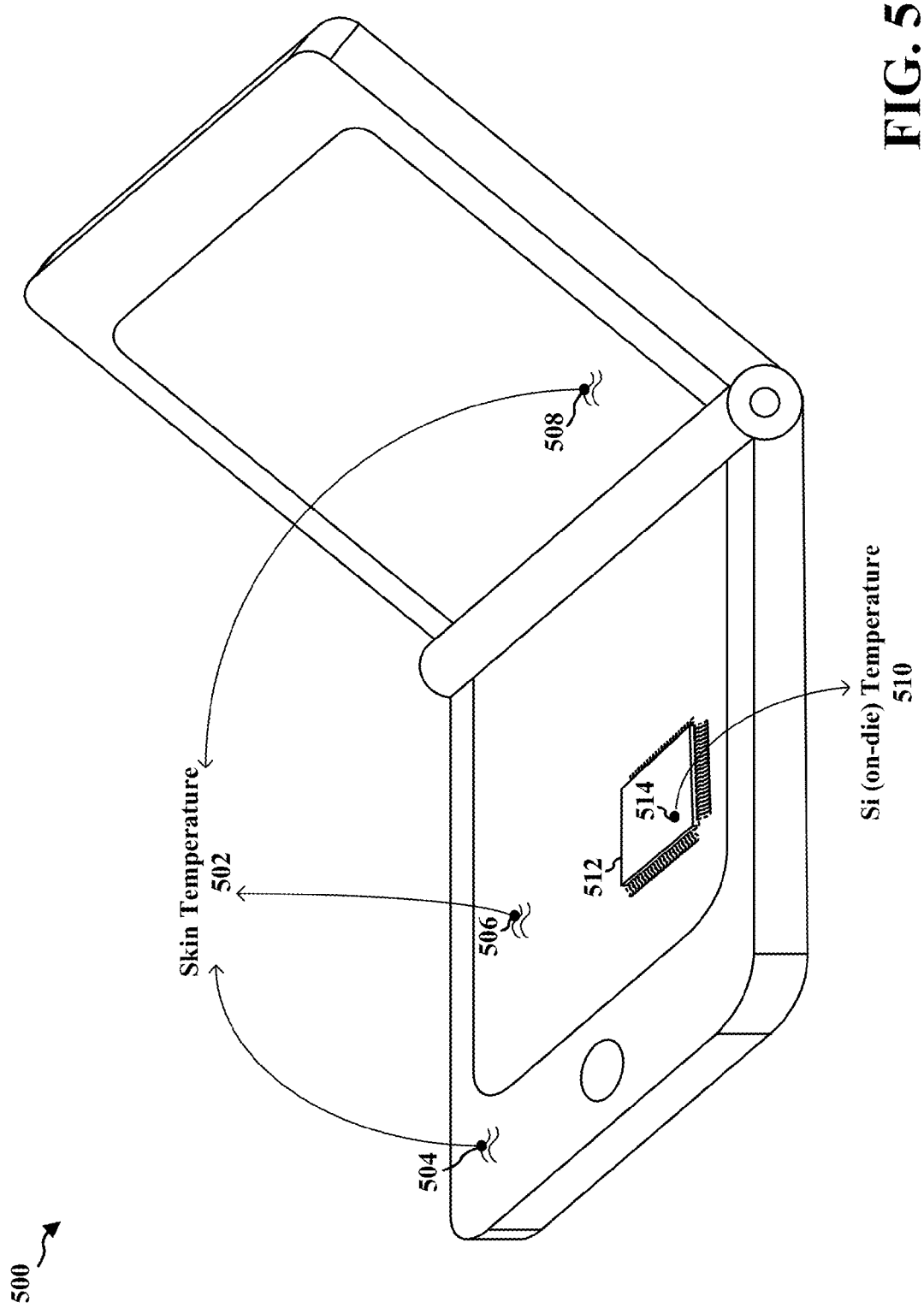
FIG. 5 is a diagram illustrating an example of skin temperature and Si temperature of a mobile device.

FIG. 5 is a diagram illustrating an example of skin temperature 502 and Si temperature 510 of a mobile device 500. In one configuration, the mobile device 500 may be the electronic device 105, 305, or the apparatus 1002/1002'. As shown, the mobile device 500 includes a chip package 512 inside the enclosure of the mobile device 500. Skin temperature 502 is the surface temperature (e.g., at surface points 504, 506, or 508) of the mobile device 500. The limit of skin temperature 502 may be fixed (static) as the limit of skin temperature 502 is determined by ergonomic requirements (e.g., the maximum temperature that a user may feel comfortable with when holding the mobile device 500).

The on-die Si temperature 510 is the temperature on the silicon circuits (e.g., at point 514) inside the chip package 512. In one aspect, the limit of Si temperature 510 may be dynamically adjusted depending on ambient wind condition and/or form-factor change of the mobile device 500. For example, when the mobile device 500 is unfolded and/or within a windy environment, the limit of Si temperature 510 may be adjusted higher, while the limit of skin temperature 502 remaining static. Dynamically adjusting the limit of Si temperature 510 may bring higher performance to the mobile device 500.

FIG. 6 is a table 600 illustrating an example of the relationship between Si temperature and skin temperature of a mobile device. In one configuration, the mobile device may be the electronic device 105, 305, or the apparatus 1002/1002'. In this example, there are four scenarios A, B, C, and D for the mobile device. Under scenario A, there is no ambient wind surrounding the mobile device and the mobile device is folded. Under scenario B, there is no ambient wind surrounding the mobile device and the mobile device is unfolded. Under scenario C, there is ambient wind surrounding the mobile device and the mobile device is folded. Under scenario D, there is ambient wind surrounding the mobile device and the mobile device is unfolded.

The Si temperature limit of the mobile device is assumed to be 80° C. using a traditional thermal management method. When the Si temperature of the mobile device is 80° C., the skin temperature will be 39° C. under scenario A, 33° C. under scenario B, 36° C. under scenario C, and 30° C. under scenario D. In this example, the skin temperature limit of the mobile device is assumed to be 36° C. Because the skin temperature under scenario A (39° C.) has exceeded the skin temperature limit of 36° C., the mobile device may throttle its performance to lower the Si temperature, thus lowering the skin temperature. Because the skin temperature under either scenario B or scenario D (33° C. or 30° C., respectively) is below the skin temperature limit of 36° C., in one aspect, the mobile device may bring its performance to a higher level by allowing higher Si temperature limit, without exceeding the limit of the skin temperature. Therefore, the difference between Si temperature and skin temperature may become larger in case of the mobile device being unfolded and/or having ambient wind.

Figure 7:
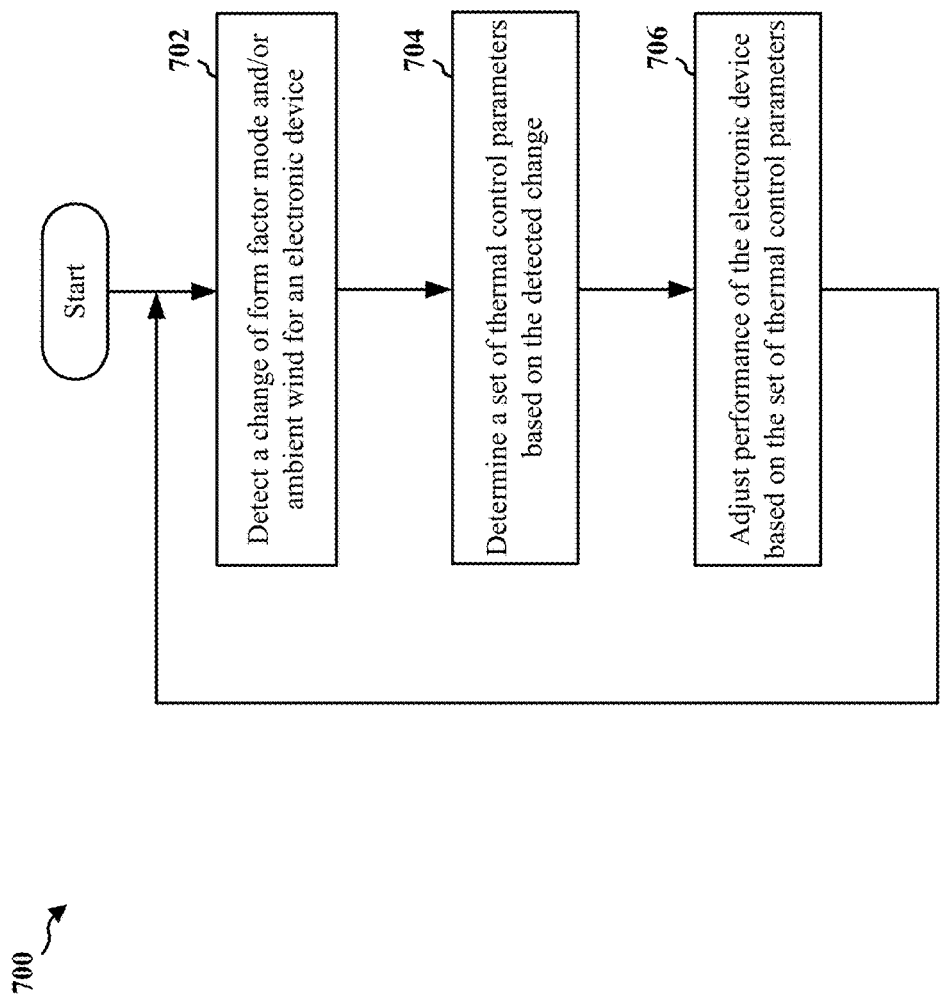
FIG. 7 is a flowchart of a method for managing the performance of an electronic device.

FIG. 7 is a flowchart 700 of a method for managing the performance of an electronic device. Specifically, flowchart 700 describes a method of an adaptive thermal control based on ambient air flow condition and/or form factor mode of the electronic device. The method may be performed by an electronic device (e.g., the electronic device 105, 305, or the apparatus 1002/1002'). At 702, the electronic device detects a change of form factor mode and/or ambient wind. The change of ambient wind may be a change of air flow speed surrounding the electronic device. In one configuration, the change of form factor mode or ambient wind is detected using one or more sensors of the electronic device. In another configuration, the change of form factor mode or ambient wind is detected using a detection circuit. In one configuration, the change of form factor mode or ambient wind is detected as described above with respect to FIGS. 1 and 3.

At 704, the electronic device determines a set of thermal control parameters based on the detected change. In one configuration, the set of thermal control parameters may be retrieved from a lookup table based on the detected change. In another configuration, the set of thermal control parameters may be calculated using a mathematical model based on the detected change. In such configuration, the mathematical model may define a variable amount of thermal power or heat that can be dissipated by the electronic device based on a heat transfer coefficient, an exposed surface area of the electronic device, a skin temperature limit, and an environmental temperature.

The heat transfer coefficient may be dynamically adjusted based on the speed of the ambient wind and a constant value. The skin temperature limit may be determined by ergonomic factors and current form factor mode of the electronic device. The skin temperature limit may be applied to actual touchable or exposed surface area of the electronic device in the current form factor mode. For example, if the electronic device is folded, the portion of the surface area folded inside may not be monitored and controlled for skin temperature limit because it is not actually touchable or exposed surface area of the electronic device.

In one configuration, the set of thermal control parameters may include one or more of a moving average power consumption limit, a maximum operating frequency limit, enabling/disabling a set of power features, a CPU scheduler policy, a mode of active cooling, or an offset between the skin temperature and the on-die Si temperature sensor measurement. In one configuration, the set of thermal control parameters may be determined as described above with respect to FIGS. 1-4.

At 706, the electronic device adjusts the performance based on the determined set of thermal control parameters. In one configuration, the electronic device may adjust one or more of the Si temperature limit, the maximum operating frequency limit, the processing throughput limit, the moving average power consumption limit, the enabling/disabling of the high performance mode, the CPU scheduler policy, or the mode of active cooling based on the determined set of thermal control parameters. The method then loops back to 702 to keep monitoring the change of form factor mode or ambient wind for the electronic device.

Figure 8:
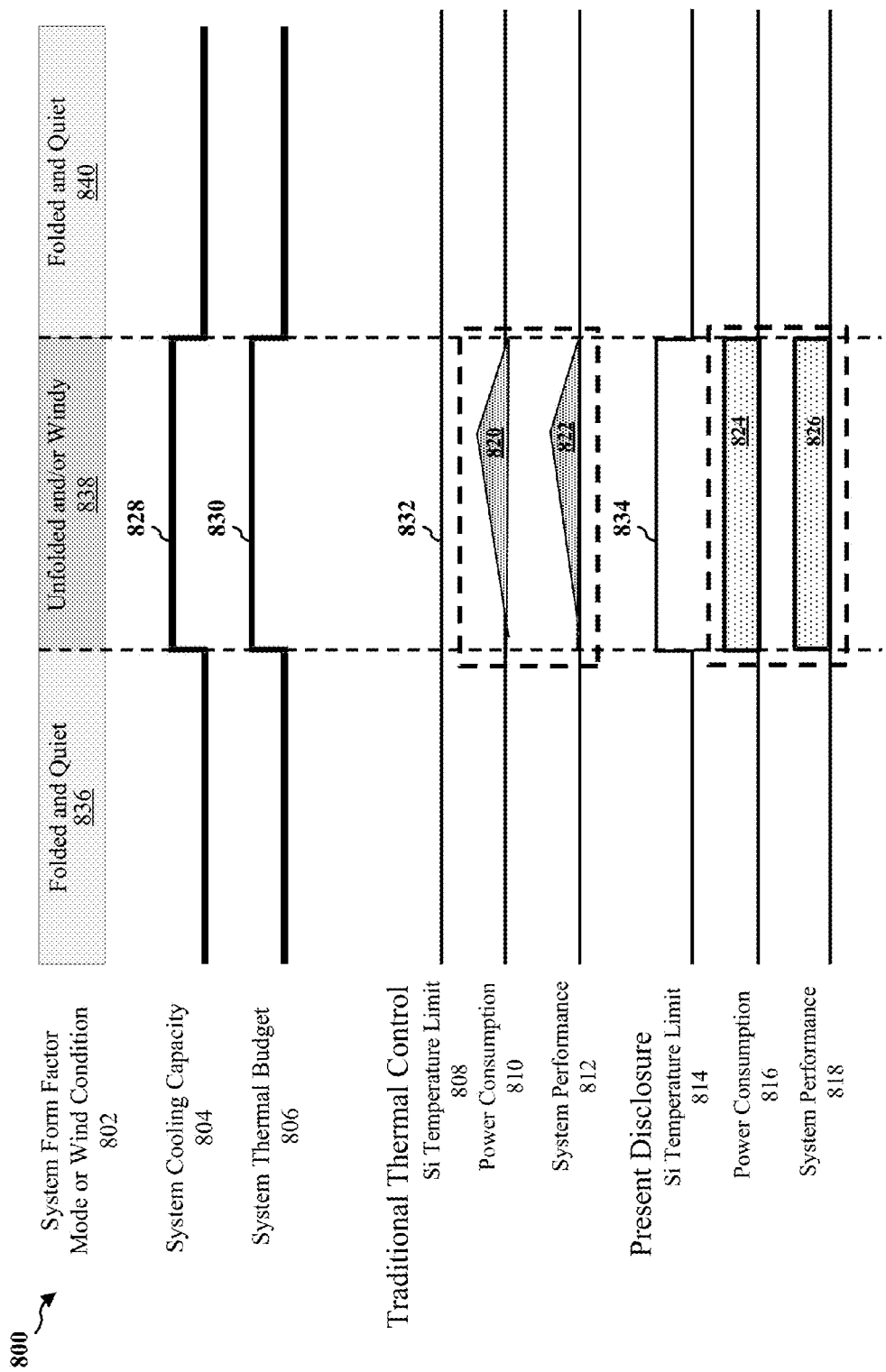
FIG. 8 is a diagram illustrating a comparison of the performance of an electronic device using a traditional thermal control method and the performance of the electronic device using the thermal control method described above with reference to FIG. 7.

FIG. 8 is a diagram 800 illustrating a comparison of the performance of an electronic device using a traditional thermal control method and the performance of the electronic device using the thermal control method described above with reference to FIG. 7. As shown, the system form factor mode or wind condition 802 of the electronic device changes from folded and quiet 836 to unfolded and/or windy

838, then changes back to folded and quiet 840. The system cooling capacity 804 of the electronic device is increased to a new level at section 828 when the electronic device is unfolded and/or exposed to ambient wind. Similarly, the system thermal budget 806 of the electronic device is increased to a new level at section 830 when the electronic device is unfolded and/or exposed to ambient wind.

When using a traditional thermal control method, the Si temperature limit (temperature threshold on silicon die) 808 of the electronic device remains the same at section 832 when the electronic device is unfolded and/or exposed to ambient wind. The Si temperature limit 808 may be static when using a traditional thermal control method. The power consumption 810 of the electronic device gradually increases then decreases in area 820 when the electronic device is unfolded and/or exposed to ambient wind. Similarly, the system performance 812 of the electronic device gradually increases then decreases in area 822 when the electronic device is unfolded and/or exposed to ambient wind. Therefore, the larger cooling capability of the electronic device when the device is unfolded and/or exposed to ambient wind is passively and partially utilized when a traditional thermal control method is used.

When using the thermal control method described above with reference to FIG. 7, the Si temperature limit (temperature threshold on silicon die) 814 of the electronic device is increased to a new level at section 834 when the electronic device is unfolded and/or exposed to ambient wind. The Si temperature limit 814 may be dynamically adjusted when using the thermal control method described above with reference to FIG. 7. The power consumption 816 of the electronic device is instantly increased to a new level in area 824 when the electronic device is unfolded and/or exposed to ambient wind. Similarly, the system performance 818 of the electronic device is instantly increased to a new level in area 826 when the electronic device is unfolded and/or exposed to ambient wind. Therefore, the larger cooling capability of the electronic device when the device is unfolded and/or exposed to ambient wind is actively detected and optimally (e.g., fully or substantially) utilized when the thermal control method described above with reference to FIG. 7 is used.

Figure 9:
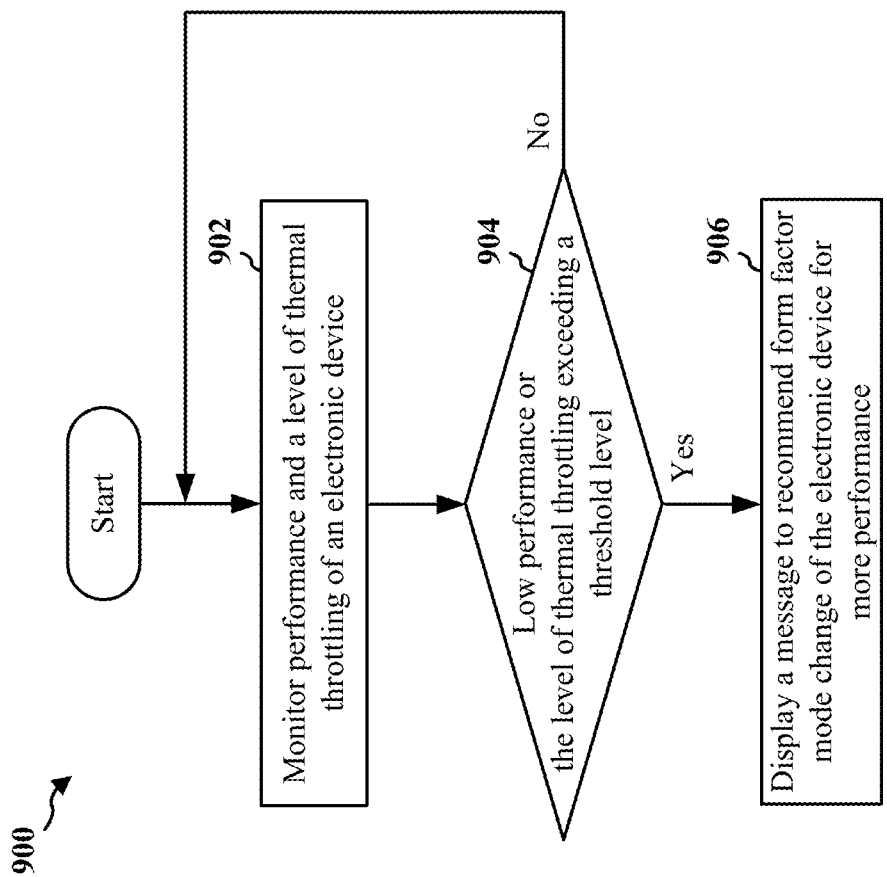
FIG. 9 is a flowchart of a method for managing the performance of an electronic device.

FIG. 9 is a flowchart 900 of a method for managing the performance of an electronic device. The method may be performed by an electronic device (e.g., the electronic device 105, 305, or the apparatus 1002/1002'). At 902, the electronic device monitors its performance and its level of thermal throttling. In one configuration, thermal throttling may include reducing clock speed or shutting down one or more components of the electronic device from time to time.

At 904, the electronic device determines whether the performance is low or the level of thermal throttling has exceeded a threshold level. In one configuration, the performance of the electronic device may be low and/or the level of thermal throttling may be high when the electronic device runs a heavy workload and the performance of the system is limited due to the current form factor mode of the electronic device. In one configuration, the performance of the electronic device may be determined to be low when the response time for a given piece of work exceeds a threshold response time, or the throughput (rate of processing work) is below a threshold value. In one configuration, the level of thermal throttling may be determined to be exceeding a threshold level when the reduction of clock speed exceeds a threshold percentage, or the percentage or number of components being shut down exceeds a threshold value, or a combination of different factors.

If the performance is low or the level of thermal throttling is high, the electronic device, at 906, displays a message (to the user) to recommend form factor mode change for more performance. For example, the message may be "for higher performance, unfold the display." If the performance is high and the level of thermal throttling is low, the method loops back to 902 to keep monitoring the performance and the level of thermal throttling of the electronic device.

Figure 10:
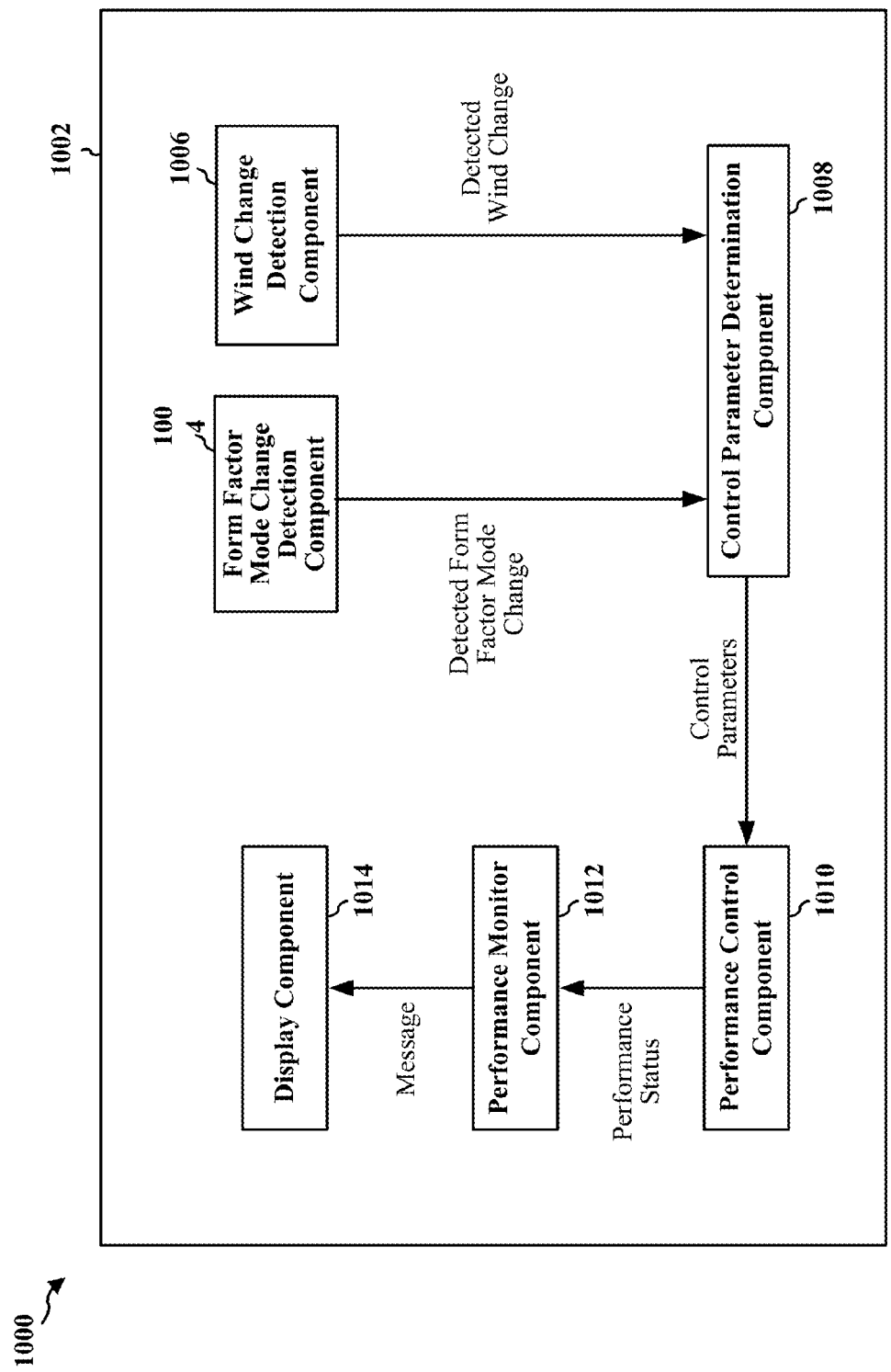
FIG. 10 is a conceptual data flow diagram illustrating the flow between different modules/means/components in an exemplary apparatus that implements the methods of FIGS. 7 and 9.

FIG. 10 is a conceptual data flow diagram 1000 illustrating the flow between different modules/means/components in an exemplary apparatus 1002 configured to implement the methods of FIGS. 7 and 9. The apparatus 1002 may be an electronic device (e.g., electronic device 105 or 305). The apparatus 1002 includes a form factor mode change detection component 1004, a wind change detection component 1006, a control parameter determination component 1008, a performance control component 1010, a performance monitor component 1012, and a display component 1014.

The form factor mode change detection component 1004 detects changes of form factor mode of the apparatus 1002. In one configuration, the form factor mode change detection component 1004 may include a piezoelectric bending sensor, physical switches, and/or magnet or Hall effect sensors. The form factor mode change detection component 1004 sends the detected form factor mode change to the control parameter determination component 1008.

The wind change detection component 1006 detects changes of ambient wind speed. In one configuration, the wind change detection component 1006 may include one or more sensors. In one configuration, the one or more sensors may be one or more microphones of the apparatus 1002 and the wind speed may be estimated based on wind noise from the microphones. In one configuration, the one or more sensors may use a piezoelectric beam (e.g., stripe or hair shaped) to determine ambient wind speed. In one configuration, the one or more sensors may detect heat spread direction in order to determine ambient wind speed. The wind change detection component 1006 sends the detected wind change to the control parameter determination component 1008. In one configuration, the form factor mode change detection component 1004 and the wind change detection component 1006 function individually or together to perform the operations describe above with reference to 702 of FIG. 7.

The control parameter determination component 1008 determines a set of thermal control parameters based on the detected form factor mode change and/or wind change. In one configuration, the set of thermal control parameters may be retrieved from a lookup table based on the detected change. In another configuration, the set of thermal control parameters may be calculated using a mathematical model based on the detected change. The control parameter determination component 1008 sends the set of thermal control parameters to the performance control component 1010. In one configuration, the control parameter determination component 1008 performs the operations describe above with reference to 704 of FIG. 7.

The performance control component 1010 adjusts performance of the apparatus 1002 based on the set of thermal control parameters received from the control parameter determination component 1008. In one configuration, the performance control component 1010 may adjust one or more of the Si temperature limit, the maximum operating frequency limit, the processing throughput limit, the moving average power consumption limit, the enabling/disabling of the high performance mode, the CPU scheduler policy, or the mode of active cooling based on the set of thermal control parameters. The performance control component 1010 may send updated performance status of the apparatus 1002 to the performance monitor component 1012. In one configuration, the performance control component 1010 performs the operations describe above with reference to 706 of FIG. 7.

The performance monitor component 1012 monitors the performance of the apparatus 1002. In one configuration, when the performance is low or the level of throttling is high, the performance monitor component 1012 sends a message to the display component 1014 to recommend form factor mode change for more performance. For example, the message may be "for higher performance, unfold the display." In one configuration, the performance monitor component 1012 performs the operations describe above with reference to 902 and 904 of FIG. 9.

The display component 1014 displays the message received from the performance monitor component 1012. The display component 1014 may include a display device (e.g., an LCD display). In one configuration, the display component 1014 performs the operations describe above with reference to 906 of FIG. 9.

The apparatus 1002 may include additional components that perform each of the blocks of the algorithm in the aforementioned flowcharts of FIGS. 7 and 9. As such, each block in the aforementioned flowcharts of FIGS. 7 and 9 may be performed by a component and the apparatus 1002 may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 11:
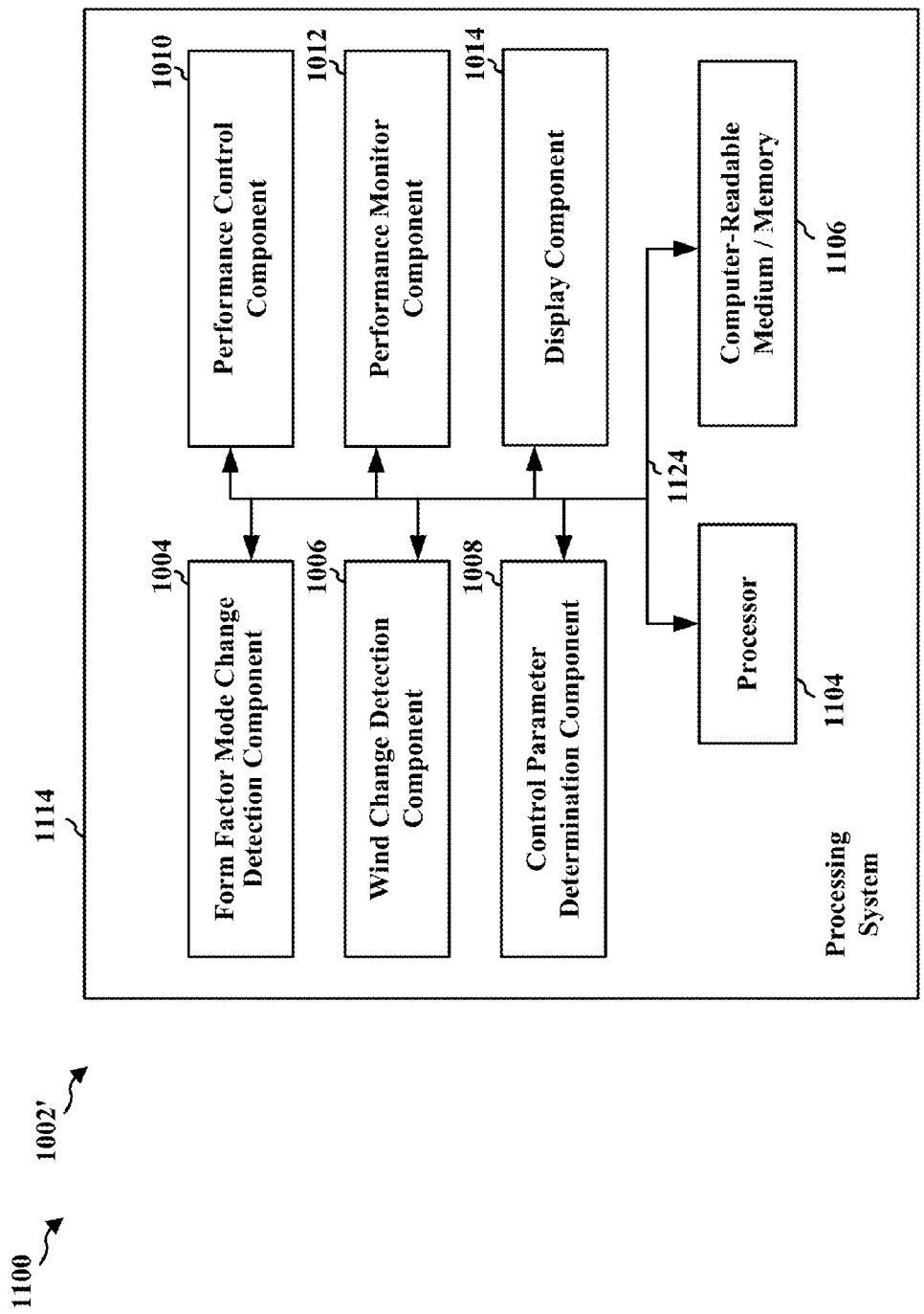
FIG. 11 is a diagram illustrating an example of a hardware implementation for an apparatus employing a processing system that implements the methods of FIGS. 7 and 9.

FIG. 11 is a diagram 1100 illustrating an example of a hardware implementation for an apparatus 1002' employing a processing system 1114 that implements the methods of FIGS. 7 and 9. The processing system 1114 may be implemented with a bus architecture, represented generally by the bus 1124. The bus 1124 may include any number of interconnecting buses and bridges depending on the specific application of the processing system 1114 and the overall design constraints. The bus 1124 links together various circuits including one or more processors and/or hardware components, represented by the processor 1104, the components 1004, 1006, 1008, 1010, 1012, 1014, and the computer-readable medium/memory 1106. The bus 1124 may also link various other circuits such as timing sources, peripherals, voltage regulators, and power management circuits, which are well known in the art, and therefore, will not be described any further.

The processing system 1114 includes a processor 1104 coupled to a computer-readable medium/memory 1106. The processor 1104 is responsible for general processing, including the execution of software stored on the computer-readable medium/memory 1106. The software, when executed by the processor 1104, causes the processing system 1114 to perform the various functions described supra for any particular apparatus. The computer-readable medium/memory 1106 may also be used for storing data that is manipulated by the processor 1104 when executing software. The processing system 1114 further includes at least one of the components 1004, 1006, 1008, 1010, 1012, and 1014. The components may be software components running in the processor 1104, resident/stored in the computer readable medium/memory 1106, one or more hardware components coupled to the processor 1104, or some combination thereof.

In one configuration, the apparatus 1002/1002' for performance management includes means for detecting a change of form factor mode or ambient wind, means for determining a set of thermal control parameters based on the detected change, and means for adjusting performance based on the set of thermal control parameters. In one configuration, the means for detecting a change of form factor mode or ambient wind may include the form factor mode change detection component 1004 configured to detect form factor mode change of the apparatus 1002/1002', and the wind change detection component 1006 configured to detect change of ambient wind speed. In one configuration, the means for detecting a change of form factor mode or ambient wind uses one or more sensors to detect the change of form factor mode or ambient wind speed.

In one configuration, the means for determining a set of thermal control parameters based on the detected change may include the control parameter determination component 1008 configured to determine the set of thermal control parameters based on the detected change. In one configuration, the means for determining a set of thermal control parameters based on the detected change is configured to retrieve the set of thermal control parameters from a lookup table based on the detected change. In another configuration, the means for determining a set of thermal control parameters based on the detected change is configured to calculate the set of thermal control parameters based on the detected change using a mathematical model.

In one configuration, the means for adjusting performance based on the set of thermal control parameters may include the performance control component 1010 configured to adjust the performance of the apparatus 1002/1002' based on the set of thermal control parameters. In one configuration, the means for adjusting performance based on the set of thermal control parameters is configured to adjust one or more of a Si temperature limit, a maximum operating frequency limit, a processing throughput limit, a moving average power consumption limit, enabling/disabling of a high performance mode, a CPU scheduler policy, or a mode of active cooling based on the set of thermal control parameters.

In one configuration, the apparatus 1002/1002' may include means for monitoring performance and level of thermal throttling, and means for displaying a message to recommend form factor mode change for more performance. In one configuration, the means for monitoring performance and level of thermal throttling may include the performance monitor component 1012 configured to monitor the performance and thermal throttling level of the apparatus 1002/1002'. In one configuration, when the performance is low or the level of throttling is high, the performance monitor component 1012 may be configured to generate a message to recommend form factor mode change for more performance. In one configuration, the means for displaying a message to recommend form factor mode change for more performance may include the display component 1014 configured to display the message generated by the means for monitoring performance and level of thermal throttling. In one configuration, the means for displaying a message to recommend form factor mode change for more performance may include an LCD display.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method for managing performance of an electronic device, comprising:
   detecting a change of at least one of a form factor mode or ambient wind for the electronic device;
   determining a set of thermal control parameters based on the detected change of the at least one of the form factor mode or the ambient wind, and on the other one of the ambient wind or the form factor mode; and
   adjusting the performance of the electronic device based on the set of thermal control parameters.

2. The method of claim 1, wherein the change is detected using a detection circuit or at least one sensor.

3. The method of claim 1, wherein the change of the form factor mode comprises at least one of folding the electronic device, unfolding the electronic device, rolling the electronic device, opening the electronic device, changing a flexible shape of the electronic device, or equipping a cover on the electronic device.

4. The method of claim 1, wherein the determining the set of thermal control parameters comprises retrieving the set of thermal control parameters from a lookup table based on the detected change.

5. The method of claim 1, wherein the determining the set of thermal control parameters comprises calculating the set of thermal control parameters based on the detected change using a mathematical model.

6. The method of claim 5, wherein the mathematical model defines a variable amount of thermal power (heat) that can be dissipated by the electronic device based on a heat transfer coefficient, an exposed surface area of the electronic device, a skin temperature limit, and an environmental temperature.

7. The method of claim 6, wherein the heat transfer coefficient is dynamically adjusted based on a wind speed of the ambient wind and a constant value.

8. The method of claim 6, wherein the skin temperature limit is determined by ergonomic factors and a current form factor mode of the electronic device, wherein the skin temperature limit is applied only to touchable surface area of the electronic device in the current form factor mode.

9. The method of claim 1, wherein the adjusting the performance of the electronic device based on the set of thermal control parameters comprises adjusting one or more of a Si temperature limit, a maximum operating frequency limit, a processing throughput limit, a moving average power consumption limit, enabling/disabling of a high performance mode, a CPU scheduler policy, or a mode of active cooling.

10. The method of claim 1, further comprising:
    monitoring the performance and a level of a thermal throttling of the electronic device; and
    displaying a message to recommend a form factor mode change of the electronic device in response to a low performance or the level of the thermal throttling exceeding a threshold level.

11. An apparatus for managing performance, comprising:
    means for detecting a change of at least one of a form factor mode or ambient wind for the apparatus;
    means for determining a set of thermal control parameters based on the detected change of the at least one of the form factor mode or the ambient wind, and on the other one of the ambient wind or the form factor mode; and
    means for adjusting the performance of the apparatus based on the set of thermal control parameters.

12. The apparatus of claim 11, wherein the change is detected using a detection circuit or at least one sensor.

13. The apparatus of claim 11, wherein the change of the form factor mode comprises at least one of folding the apparatus, unfolding the apparatus, rolling the apparatus, opening the apparatus, changing a flexible shape of the apparatus, or equipping a cover on the apparatus.

14. The apparatus of claim 11, wherein the means for determining the set of thermal control parameters is configured to retrieve the set of thermal control parameters from a lookup table based on the detected change.

15. The apparatus of claim 11, wherein the means for determining the set of thermal control parameters is configured to calculate the set of thermal control parameters based on the detected change using a mathematical model.

16. The apparatus of claim 15, wherein the mathematical model defines a variable amount of thermal power (heat) that can be dissipated by the apparatus based on a heat transfer coefficient, an exposed surface area of the apparatus, a skin temperature limit, and an environmental temperature.

17. The apparatus of claim 16, wherein the heat transfer coefficient is dynamically adjusted based on a wind speed of the ambient wind and a constant value.

18. The apparatus of claim 16, wherein the skin temperature limit is determined by ergonomic factors and a current form factor mode of the apparatus, wherein the skin temperature limit is applied only to touchable surface area of the apparatus in the current form factor mode.

19. The apparatus of claim 11, wherein the means for adjusting the performance is configured to adjust one or more of a Si temperature limit, a maximum operating frequency limit, a processing throughput limit, a moving average power consumption limit, enabling/disabling of a high performance mode, a CPU scheduler policy, or a mode of active cooling.

20. The apparatus of claim 11, further comprising:
means for monitoring the performance and a level of a thermal throttling of the apparatus; and
means for displaying a message to recommend a form factor mode change of the apparatus in response to a low performance or the level of the thermal throttling exceeding a threshold level.

21. An apparatus for managing performance, comprising:
a memory; and
at least one processor coupled to the memory and configured to:
detect a change of at least one of a form factor mode or ambient wind for the apparatus;
determine a set of thermal control parameters based on the detected change of the at least one of the form factor mode or the ambient wind, and on the other one of the ambient wind or the form factor mode; and
adjust the performance of the apparatus based on the set of thermal control parameters.

22. The apparatus of claim 21, wherein the change is detected using a detection circuit or at least one sensor.

23. The apparatus of claim 21, wherein the change of the form factor mode comprises at least one of folding the apparatus, unfolding the apparatus, rolling the apparatus, opening the apparatus, changing a flexible shape of the apparatus, or equipping a cover on the apparatus.

24. The apparatus of claim 21, wherein, to determine the set of thermal control parameters, the at least one processor is configured to:
retrieve the set of thermal control parameters from a lookup table based on the detected change; or
calculate the set of thermal control parameters based on the detected change using a mathematical model.

25. The apparatus of claim 24, wherein the mathematical model defines a variable amount of thermal power (heat) that can be dissipated by the apparatus based on a heat transfer coefficient, an exposed surface area of the apparatus, a skin temperature limit, and an environmental temperature.

26. The apparatus of claim 25, wherein the heat transfer coefficient is dynamically adjusted based on a wind speed of the ambient wind and a constant value.

27. The apparatus of claim 25, wherein the skin temperature limit is determined by ergonomic factors and a current form factor mode of the apparatus, wherein the skin temperature limit is applied only to touchable surface area of the apparatus in the current form factor mode.

28. The apparatus of claim 21, wherein, to adjust the performance, the at least one processor is configured to adjust one or more of a Si temperature limit, a maximum operating frequency limit, a processing throughput limit, a moving average power consumption limit, enabling/disabling of a high performance mode, a CPU scheduler policy, or a mode of active cooling.

29. The apparatus of claim 21, wherein the at least one processor is further configured to:
monitor the performance and a level of a thermal throttling of the apparatus; and
display a message to recommend a form factor mode change of the apparatus in response to a low performance or the level of the thermal throttling exceeding a threshold level.

30. A non-transitory computer-readable medium storing computer executable code for managing performance of an electronic device, the computer executable code comprising instructions for:
detecting a change of at least one of a form factor mode or ambient wind for the electronic device;
determining a set of thermal control parameters based on the detected change of the at least one of the form factor mode or the ambient wind, and on the other one of the ambient wind or the form factor mode; and
adjusting the performance of the electronic device based on the set of thermal control parameters.

* * * * *